(12) United States Patent
Van Hoyweghen

(10) Patent No.: US 8,487,033 B2
(45) Date of Patent: Jul. 16, 2013

(54) THERMOPLASTIC ELASTOMER COMPOSITIONS, METHODS FOR MAKING THE SAME, AND ARTICLES MADE THEREFROM

(75) Inventor: Danny Van Hoyweghen, Heverlee (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 1220 days.

(21) Appl. No.: 11/803,790

(22) Filed: May 16, 2007

(65) Prior Publication Data

US 2008/0287588 A1    Nov. 20, 2008

(51) Int. Cl.
C08K 5/5415    (2006.01)
C08L 9/00    (2006.01)
C08L 23/00    (2006.01)
C08L 23/04    (2006.01)

(52) U.S. Cl.
USPC .......... 524/493; 524/570; 525/191; 525/232; 525/240

(58) Field of Classification Search
USPC ............... 524/493, 570; 525/191, 232, 240
See application file for complete search history.

(56) References Cited

U.S. PATENT DOCUMENTS

| | | | |
|---|---|---|---|
| 3,660,288 A * | 5/1972 | Hansen | 508/521 |
| 4,016,342 A | 4/1977 | Wagensommer | |
| 4,306,041 A | 12/1981 | Cozewith et al. | |
| 4,311,628 A | 1/1982 | Abdou-Sabet et al. | |
| 4,472,538 A | 9/1984 | Kamingaito et al. | |
| 4,530,914 A | 7/1985 | Ewen et al. | |
| 4,594,390 A | 6/1986 | Abdou-Sabet et al. | |
| 4,810,734 A | 3/1989 | Kawasumi et al. | |
| 4,889,885 A | 12/1989 | Usuki et al. | |
| 5,057,475 A | 10/1991 | Canich et al. | |
| 5,100,947 A | 3/1992 | Puydak et al. | |
| 5,157,081 A | 10/1992 | Puydak et al. | |
| 5,171,908 A | 12/1992 | Rudnick | |
| 5,391,790 A | 2/1995 | Rohrmann et al. | |
| 5,576,373 A | 11/1996 | Kresge et al. | |
| 5,641,848 A | 6/1997 | Giacobbe et al. | |
| 5,665,183 A | 9/1997 | Kresge et al. | |
| 5,783,531 A | 7/1998 | Andrew et al. | |

(Continued)

FOREIGN PATENT DOCUMENTS

| | | |
|---|---|---|
| EP | 1655331 | 5/2006 |
| JP | 09157426 | 6/1997 |

(Continued)

OTHER PUBLICATIONS

Ellul et al., "Crosslink Densities and Phase Morphologies in Dynamically Vulcanized TPEs,", 68, *Rubber Chemistry and Technology*, pp. 573-584 (1995).

(Continued)

*Primary Examiner* — Satya Sastri

(57) ABSTRACT

Provided are thermoplastic elastomer compositions composed of a thermoplastic component, an elastomeric component, and at least one particulate composition. Particulate compositions are composed of a particulate material and a carrier medium. Exemplary particulate materials include minerals, mineral compounds, including mineral oxides, clays, carbon, nanotubes, and combinations thereof. Typical carrier mediums are one or more polar polymers, apolar polymers, one or more oils, poly α-olefins, or combinations thereof. The at least one particulate composition is dispersed within the thermoplastic component and/or the elastomeric component. Particulate compositions include clay grease compositions wherein a clay, e.g., an exfoliated clay, is utilized as a thickener.

20 Claims, 2 Drawing Sheets

U.S. PATENT DOCUMENTS

| | | | |
|---|---|---|---|
| 5,807,629 A | 9/1998 | Elspass et al. | |
| 5,883,173 A | 3/1999 | Elspass et al. | |
| 5,891,830 A | 4/1999 | Koltermann et al. | |
| 5,936,023 A | 8/1999 | Kato et al. | |
| 5,973,053 A | 10/1999 | Usuki et al. | |
| 6,034,164 A | 3/2000 | Elspass et al. | |
| 6,103,817 A | 8/2000 | Usuki et al. | |
| 6,271,297 B1 * | 8/2001 | Ishida | 524/445 |
| 6,319,998 B1 | 11/2001 | Cozewith et al. | |
| 6,060,549 A1 | 6/2002 | Moehr | |
| 6,407,043 B1 | 6/2002 | Moehr | |
| 6,642,316 B1 | 11/2003 | Datta et al. | |
| 6,867,260 B2 | 3/2005 | Datta et al. | |
| 6,927,258 B2 | 8/2005 | Datta et al. | |
| 7,094,835 B2 | 8/2006 | Datta et al. | |
| 7,132,478 B2 | 11/2006 | Datta et al. | |
| 7,294,675 B2 * | 11/2007 | Hoyweghen et al. | 525/191 |
| 2004/0054059 A1 | 3/2004 | Parker et al. | |
| 2004/0147677 A1 | 7/2004 | Angus et al. | |
| 2004/0260021 A1 | 12/2004 | Macedo et al. | |
| 2004/0266947 A1 | 12/2004 | Macedo et al. | |
| 2005/0032937 A1 | 2/2005 | Tsou et al. | |
| 2005/0277738 A1 * | 12/2005 | Hoyweghen et al. | 525/191 |

FOREIGN PATENT DOCUMENTS

| | | |
|---|---|---|
| WO | WO 92/02582 | 2/1992 |
| WO | WO 96/35751 | 11/1996 |
| WO | WO 02/100923 | 12/2002 |
| WO | WO 03/106552 | 12/2003 |
| WO | WO 2005/017016 | 2/2005 |
| WO | WO 2007/011456 | 1/2007 |

OTHER PUBLICATIONS

Leslie R. Rudnick & Ronald L. Shubkin, *Synthetic Lubricants and High-Performance Functional Fluids,* pp. 1-52, Marcel Dekker, Inc. (1999).

* cited by examiner

THERMOPLASTIC ELASTOMER COMPOSITIONS, METHODS FOR MAKING THE SAME, AND ARTICLES MADE THEREFROM

FIELD OF THE INVENTION

This invention relates to thermoplastic elastomer compositions, articles made therefrom, and methods for making the same, and more particularly to thermoplastic elastomer compositions including a finely dispersed particulate composition.

BACKGROUND OF THE INVENTION

Conventional thermoplastic polymer compositions have a near limitless number of uses. As a result of having a favorable combination of durability and processability, thermoplastic polymers are used pervasively in various fields such as, for example, the automobile industry, manufacturing of industrial and domestic appliances, and hand-held utensils and tools.

Thermoplastic elastomer compositions are one type of thermoplastic polymer composition that combine both thermoplastic and elastic properties. These properties are generally obtained by combining a thermoplastic polymer with a rubber composition in a way such that the rubber is dispersed in the thermoplastic polymer. Conventional thermoplastic elastomer compositions include, for example, polybutadiene or polyisoprene dispersed in a matrix of thermoplastic polymer such as polypropylene.

Conventional additives are combined with thermoplastic elastomers to impart favorable physical properties. Traditional additives include, for example, organic and inorganic fillers. Conventional inorganic fillers such as clay have been added to dynamically vulcanized polymer systems.

Unfortunately some conventional additives, e.g., have been found to adversely impact thermoplastic elastomer compositions properties due to interaction with thermoplastic components, elastomer components, or curing agents. Undesirable interaction with curing agents may prevent or inhibit vulcanization processes and eliminate or degrade physical properties.

Accordingly there exists a current and long felt need for thermoplastic elastomer compositions that overcome known deficiencies in conventional compositions, have advantageous processing and thermoforming processing characteristics, and are generally suitable for thermoplastic elastomer (TPE) and thermoplastic vulcanizate (TPV) applications.

SUMMARY OF THE INVENTION

Provided are thermoplastic elastomer compositions composed of a thermoplastic component, an elastomeric component, and at least one particulate composition. Particulate compositions are composed of a particulate material and a carrier medium. Exemplary particulate materials include minerals, mineral compounds, including mineral oxides, clays, carbon, e.g., activated carbon, nanotubes, and combinations thereof. Typical carrier mediums are one or more polar polymers, apolar polymers, one or more oils, poly α-olefins, or combinations thereof. The at least one particulate composition is dispersed within the thermoplastic component and/or the elastomeric component. Particulate compositions include clay grease compositions wherein a clay, e.g., an exfoliated clay, is utilized as a thickener.

Particulate compositions require relatively low quantities of particulate material such as clay to impart favorable characteristics to thermoplastic elastomer compositions due to the large surface area to volume ratio of the particles. However, in some embodiments relatively large quantities of particulate material are utilized. Particulate compositions preferably provide small, uniform particle size dispersions, which impart thermoplastic elastomer compositions with favorable physical properties, including for example, improved surface roughness, increased mechanical strength, improved consistency, extended useful life, reduced oil separation, high temperature performance, high dropping point, oxidation stability, fretting wear protection, flame retardancy, barrier properties, and/or noise reduction.

Methods of preparing thermoplastic elastomer compositions generally include providing a thermoplastic component, providing an elastomeric component, providing a particulate composition, and combining the thermoplastic component, elastomeric component, and particulate composition to form a thermoplastic elastomer composition. Particulate compositions are combined with the thermoplastic component, the elastomeric component, or a combination of both the thermoplastic component and the elastomeric component. Particulate compositions may be added to the thermoplastic component and/or elastomeric component before or after the elastomeric component and thermoplastic component are combined.

DETAILED DESCRIPTION OF ILLUSTRATIVE EMBODIMENTS

Figure 1A:
FIG. 1A is a magnified view of an exemplary thermoplastic elastomer composition magnified 2550×.

Provided are thermoplastic elastomer compositions composed of a thermoplastic component, an elastomeric component, and at least one particulate composition. The at least one particulate composition is dispersed within the thermoplastic component and/or the elastomeric phase. Particulate compositions preferably provide small, uniform particle size dispersions, which impart thermoplastic elastomer compositions with favorable physical properties, including for example, improved surface roughness, increased mechanical strength, improved consistency, extended useful life, reduced oil separation, high temperature performance, high dropping point, oxidation stability, fretting wear protection, flame retardancy, barrier properties, and/or noise reduction.

The thermoplastic component is composed of one or more thermoplastic polymers, including propylene polymers, known to those skilled in the art. Thermoplastic polymers include, for example, non-polar or polar engineering plastics.

"Polypropylene," "polypropylene polymer(s)," or "propylene polymer(s)" mean homopolymers, copolymers, terpolymers, higher order polymers, impact copolymers, or interpolymers made from propylene derived units, or combinations thereof.

As used herein "homopolymer" means polymers resulting from the polymerization of a single monomer, i.e., a polymer consisting essentially of a single type of repeating unit.

As used herein, the term "copolymer(s)" refers to polymers formed by the polymerization of at least two different monomers. For example, the term "copolymer" includes the copolymerisation reaction product of ethylene or propylene and an α-olefin, such as for example, 1-hexene.

Propylene polymers include each polypropylene known to those skilled in the art. Propylene polymers can vary widely in composition. Examples of propylene polymers include stereoregular polypropylene, stereoregular polypropylene segments separated by amorphous polypropylene, amorphous polypropylene, polypropylene copolymers, propylene terpolyomers, and higher order propylene copolymers. As used herein "stereoregular polypropylene" means polypropylene having stereoregular propylene sequences long enough to crystallize under conditions known to those skilled in the art.

Other exemplary thermoplastic components include for example crystalline polyolefins (polypropylene, polyethylene, etc.), polyamides, polyimides, polyesters (nylons), poly (phenylene ether), polycarbonates, styrene-acrylonitrile copolymers, polyethylene terephthalate, polybutylene terephthalate, polyphenylene sulfide (PPS), polystyrene, polystyrene derivatives, polyphenylene oxide (PPO), polyoxymethylene, polysulfones, polylactones, polyacetals, acrylonitrile-butadiene-styrene resins (ABS), fluorine-containing thermoplastics, styrene maleic anhydride resins (SMA), aromatic polyketones (PEEK, PED, and PEKK), and mixtures thereof.

In one embodiment, the thermoplastic component is highly crystalline isotactic or syndiotactic polypropylene. This polypropylene generally has a density of from about 0.85 to about 0.91 g/cc. Preferably, isotactic polypropylene has a density of from about 0.90 to about 0.91 g/cc. More preferably, the thermoplastic component is a high and ultra-high molecular weight polypropylene having a fractional melt flow rate. Such high and ultra-high molecular weight polypropylenes are characterized by a melt flow rate that is less than or equal to about 10 dg/min, or more preferably less than or equal to about 1.0 dg/min as measured by ASTM D-1238 at 230° C. and 2.16 kg.

An exemplary thermoplastic component includes a propylene copolymer, which may also be referred to as a propylene-α-olefin copolymer. Propylene copolymer includes one or more units, i.e., mer units, derived from propylene, one or more comonomer units derived from ethylene or α-olefins including from 4 to about 20 carbon atoms. Optionally, one or more comonomer units derive from dienes.

In one or more embodiments, the α-olefin comonomer units derive from ethylene, 1-butene, 1-hexane, 4-methyl-1-pentene and/or 1-octene. Exemplary alpha-olefins are selected from the group consisting of ethylene, butene-1, pentene-1,2-methylpentene-1,3-methylbutene-1, hexene-1, 3-methylpentene-1,4-methylpentene-1,3,3-dimethylbutene-1, heptene-1, hexene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1, and hexadodecene-1.

Exemplary diene comonomer units include 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, 2-methyl-1,6 octadiene, 2-methyl-1,5-hexadiene, or combinations thereof.

Exemplary thermoplastic components are described in U.S. Pat. Nos. 5,100,947, 4,594,390, and 4,311,628, each of which is herein incorporated by reference in its entirety. Exemplary propylene copolymers are described in U.S. Pat. Nos. 7,132,478, 7,094,835, 6,927,258, 6,867,260, and 6,642,316, each of which is herein incorporated by reference in its entirety. Exemplary thermoplastic components are commercially available as VISTAMAXX® from ExxonMobil Chemical of Houston, Tex.

Preferably, the thermoplastic component is a solid, generally high molecular weight plastic material. In one embodiment, the thermoplastic component is a crystalline or a semi-crystalline polymer resin. In another embodiment, the resin has a crystallinity of at least 25 percent as measured by differential scanning calorimetry. Polymers with a high glass transition temperature are also acceptable as the thermoplastic resin. The melt temperature of these resins should generally be lower than the decomposition temperature of the rubber.

The thermoplastic component has a weight average molecular weight of from about 5,000 to about 5,000,000 g/mole, or from about 10,000 to about 1,000,000 g/mole, or from about 20,000 to about 500,000, and in other embodiments a Mw of from about 50,000 to about 400,000 g/mole. In another embodiment, the thermoplastic component has a weight average molecular weight of from about 150,000 to about 600,000, and a number average molecular weight from about 40,000 to about 200,000. In another embodiment, these resins have a weight average molecular weight from about 300,000 to about 500,000, and a number average molecular weight from about 90,000 to about 150,000.

The melting point of the thermoplastic component depends upon the desired properties and intended end and therefore is readily determined by those skilled in the art. Generally the thermoplastic component has a melting temperature ($T_m$) of at least 25° C. Preferably, the thermoplastic component has a melt temperature of from about 50° C. to about 350° C. More preferably, the thermoplastic component has a melting temperature of from about 65° C. to about 175° C. Typically, polar thermoplastic resins, whether crystalline or glassy, have a higher melt temperature, such as for example, from about 180° C. to about 300° C. Non-polar thermoplastic resins have a melt temperature from about 140° C. to about 170° C. In one or more embodiments, the melt temperature ranges from about 160° C. to about 170° C. The glass transition temperature ($T_g$) of non-polar thermoplastic resins generally is from about minus 20° C. to about 20° C.

As used herein, all temperatures are determined by differential scanning calorimetry ("DSC"), unless expressly stated otherwise. An exemplary method of identifying a composition's melting temperature is determined by first pressing a sample of the composition at elevated temperature and removing the sample with a punch die. The sample is then annealed at room temperature. After annealing, the sample is placed in a differential scanning calorimeter, e.g., Perkin Elmer 7 Series Thermal Analysis System, and cooled. Then the sample is heated to a final temperature and the thermal output is recorded as the area under the melting peak curve of the sample. The thermal output in joules is a measure of the heat of fusion. The melting point is recorded as the temperature of the greatest heat absorption within the range of melting of the sample. This is called the first melt. The sample is then cooled. The sample is reheating to form a second melt, which is more reproducible than the first melt. The peak melting temperature from the second melt is recorded as the second $T_m$.

In one embodiment, the melt flow rate ("MFR") of the thermoplastic component, as measured according to ASTM D-1238 at 2.16 kg weight and 230° C., is at least about 0.2 dg/min, or at least about 0.5 dg/min, and in other embodiments at least about 1.0 dg/min. The thermoplastic component has a melt flow rate of not more than about 350 dg/min, or not more than about 100 dg/min. In one or more embodiments, the thermoplastic component has a MFR of from about 0.5 dg/min to about 350 dg/min, or from about 2 dg/min to about 30 dg/min, or from about 5 dg/min to about 30 dg/min, or from about 10 dg/min to about 30 dg/min, and in other embodiments from about 10 dg/min to about 25 dg/min.

The elastomeric component is composed of materials having elastic properties known to those skilled in the art, such as for example elastomers or rubbers. Elastomers include, for example, elastomeric polypropylene, olefinic elastomeric copolymers, such as for example, ethylene-propylene rubbers, propylene-based rubbery copolymers, and/or ethylene-based plastomers. Other exemplary elastomeric components include butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, synthetic polyisoprene rubber, epichlorohydrine terpolymer rubber, and polychloroprene. In one embodiment, the elastomeric component is a halobutyl rubber.

Ethylene-propylene rubbers include, for example, ethylene propylene monomer rubber (EPM) and ethylene propylene diene monomer rubber (EPDM). Ethylene-propylene rubbers also include propylene based copolymers polymerized with ethylene, at least one α-olefin monomer, and combinations thereof, and optionally at least one diene monomer.

Examples of α-olefins include, but are not limited to, propylene, 1-butene, 1-hexene, 4-methyl-1-pentene, 1-octene, 1-decene, or combinations thereof. In one embodiment, the α-olefins include propylene, 1-hexene, 1-octene, or combinations thereof. The diene monomers may include, but are not limited to, 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, dicyclopentadiene, 2-methyl-1,6 octadiene, and 2-methyl-1,5-hexadiene, or combinations thereof.

Ethylene-propylene rubbers include from about 12 to about 85 weight percent ethylene units deriving from ethylene monomer. Preferably, ethylene-propylene rubbers include from about 20 weight percent to about 80 weight percent, or from about 40 weight percent to about 70 weight percent ethylene units deriving from ethylene monomer. More preferably, ethylene-propylene rubbers include from about 60 weight percent to about 66 weight percent ethylene units deriving from ethylene monomer.

Optionally, ethylene-propylene rubbers include from about 0.1 weight percent to about 15 weight percent diene units deriving from diene monomer. Preferably, ethylene-propylene rubbers include from about 0.5 weight percent to about 12 weight percent, or from about 1 weight percent to about 10 weight percent diene units deriving from diene monomer. More preferably, ethylene-propylene rubbers include from about 2 weight percent to about 8 weight percent diene units deriving from diene monomer.

Ethylene-propylene rubbers have a weight average molecular weight (Mw) that is generally at least about 50,000, but may be lower in some embodiments. Ethylene-propylene rubbers have a weight average molecular weight of at least about 100,000, or at least about 200,000, and in other embodiments at least about 300,000. The weight average molecular weight of ethylene-propylene rubbers is generally not more than about 1,200,000. Preferably, the weight average molecular weight of ethylene-propylene rubbers is not more than about 1,000,000, or not more than about 900,000. More preferably, the weight average molecular weight of ethylene-propylene rubbers is not more than about 800,000.

In one or more embodiments, ethylene-propylene rubbers have a number average molecular weight (Mn) that is at least about 20,000. Preferably, ethylene-propylene rubbers have a number average molecular weight of at least about 60,000, or at least about 100,000, and in other embodiments at least about 150,000. The number average molecular weight of ethylene-propylene rubber is not more than about 500,000. Preferably, the number average molecular weight of ethylene-propylene rubber is not more than about 400,000, or not more than about 300,000, and in other embodiments not more than about 250,000.

Ethylene-propylene rubbers may also be characterized as having a Mooney viscosity, of from about 25 to about 500 or from about 50 to about 450. Thermoplastic elastomer compositions may optionally employ oil-extended forms of high molecular weight polymers when thermoplastic elastomer compositions are prepared with higher molecular weight rubbers. These oil-extended copolymers typically include from about 15 to about 100 parts by weight, per 100 parts by weight rubber ("phr"), of a paraffinic oil. The Mooney viscosity of these oil-extended copolymers may be from about 35 to about 80 or from about 45 to about 70.

Unless otherwise specified, Mooney viscosity is reported herein as ML(1+4@125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.)

More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin. ASTM D 1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). It should be noted that the run time of 4 minutes at the end of which the Mooney reading is taken remains the same as the standard conditions.

One MST point is approximately equivalent to 5 mL points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4@125° C.) value equivalent. The MST rotor used herein was prepared and utilized according to the following specifications: The rotor should have a diameter of 30.48±0.03 mm and a thickness of 2.8±0.03 mm (determined from the tops of serrations) and a shaft of 11 mm or less in diameter. The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch. The rotor is positioned in the center of the die cavity such that the centerline of the rotor disk coincides with the centerline of the die cavity to within a tolerance of ±0.25 mm. A spacer or a shim may be used to raise the shaft to the midpoint, consistent with practices typical in the art for Mooney determination. The wear point (cone shaped protuberance located at the center of the top face of the rotor) shall be machined off flat with the face of the rotor.

Mooney viscosities of multimodal polymer compositions may be determined on blends of polymers herein. The Mooney viscosity of a particular component of blends is obtained herein using the following formula:

$$\log ML = nA \log MLA + nB \log MLB$$

wherein all logarithms are to the base 10; ML is the Mooney viscosity of a blend of two polymers A and B each having individual Mooney viscosities MLA and MLB, respectively; nA represents the wt. % fraction of polymer A in the blend; and nB represents the wt. % fraction of the polymer B in the blend.

Ethylene-propylene rubbers may be characterized as having an intrinsic viscosity, as measured in Decalin at 135° C., of from about 2 dl/g to about 8 dl/g, or from about 3 dl/g to about 7 dl/g, or from about 4 dl/g to about 6.5 dl/g.

Elastomeric copolymers suitable for use in the present compositions are commercially available under the tradenames Vistalon™ (ExxonMobil Chemical Co.; Houston, Tex.), Keltan™ (DSM Copolymers; Baton Rouge, La.), Nordel™ IP & Nordel MG™ (Dow Chemical Company; Wilmington, Del.), Royalene™ (Lion Corporation) and Buna™ (Lanxess). Preferred commercial elastomeric components include the VISTALON® 7500 high molecular weight EPDM, Mooney Viscosity (ML(1+4@125° C.) of about 91 and NORDEL™ IP and MG EPDM grades having Mooney Viscosity (ML(1+4@125° C.) of 60 and above. The NORDEL™ IP and MG products are useful because their production by gas phase EPDM processes avoids the use of solvents and process oils while still maintaining high molecular weight.

Butyl rubbers are rubbery amorphous copolymers of isobutylene and isoprene or an amorphous terpolymer of isobutylene, isoprene, and a divinyl aromatic monomer. Preferablyl, butyl rubbers include isoprene. Butyl rubbers also include halogenated copolymers and terpolymers.

In one or more embodiments, butyl rubbers include from about 0.5 to about 10 percent by weight isoprene. More preferably, butyl rubbers include from about 1.0 to about 4 percent by weight of isoprene.

Butyl rubbers include copolymers and terpolymers halogenated with from about 0.1 to about 10 weight percent, or preferably from about 0.5 to about 3.0 weight percent, chlorine or bromine.

Butyl rubber is commercially available from a number of sources as disclosed in the Rubber World Blue Book. For example, butyl and halobutyl rubber is available under the tradename EXXONMOBIL® BUTYL (ExxonMobil Chemical Co.) or POLYSAR® BUTYL (Polysar Ltd.). Commercial quantities of butyl rubbers are prepared by polymerization at low temperature in the presence of a Friedel-Crafts catalyst.

Thermoplastic elastomer compositions contain a sufficient amount of the elastomeric component to form rubbery compositions of matter. The skilled artisan will understand that rubbery compositions of matter include, but are not limited to for example, those compositions having ultimate elongations greater than 100 percent, and that quickly retract to 150% or less of their original length within about 10 minutes after being stretched to 200% of their original length and held at 200% of their original length for about 10 minutes.

In one or more embodiments, thermoplastic elastomer compositions are characterized with respect to 100 parts of elastomeric component (phr). Accordingly, thermoplastic elastomer compositions are composed of from about 5 to about 500 phr of thermoplastic component. Preferably, thermoplastic elastomer compositions are composed of from about 25 to about 400 phr of thermoplastic component. In other embodiments, thermoplastic elastomer compositions are composed of from about 50 to about 250 phr of thermoplastic component.

Particulate compositions are composed of a particulate material and a carrier medium. Particulate materials include those conventional particulates commonly utilized in thermoplastic and/or elastomeric compositions that are known to those skilled in the art. Exemplary particulate materials include minerals, mineral compounds, including mineral oxides, clays, carbon, e.g., activated carbon, nanotubes, and combinations thereof. Particulate materials include coated, partially coated, or uncoated particulates. For example, particulate materials include particulates at least partially coated with waxes, e.g., stearic waxes, oxides, polymers, inorganic compounds, and combinations thereof.

Carrier mediums include those conventional carrier mediums known to those skilled in the art. The carrier medium may be solid or liquid. Carrier mediums are either polar or apolar materials. Exemplary carrier mediums include one or more polar polymers, one or more apolar polymers, one or more oils, poly Q-olefins (PAO), polar plasticizers, apolar plasticizers, or combinations thereof. Exemplary polar plasticizers include the phthalate family utilized for PVC plastification.

Figure 1B:
FIG. 1B is a magnified view of an exemplary thermoplastic elastomer composition magnified 29000×.
Figure 1C:
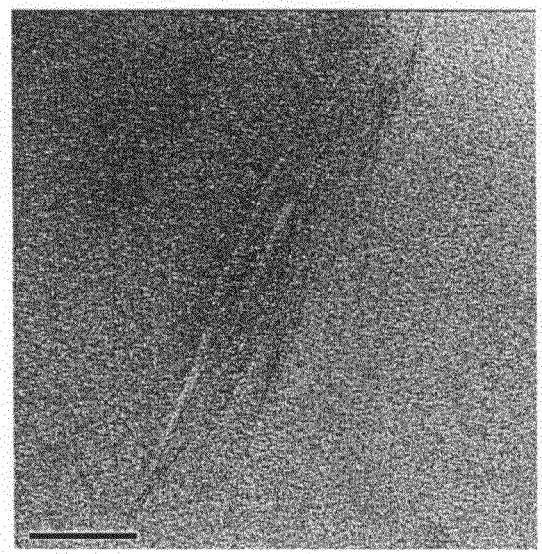
FIG. 1C is a magnified view of an exemplary thermoplastic elastomer composition magnified 71000×.
Figure 1D:
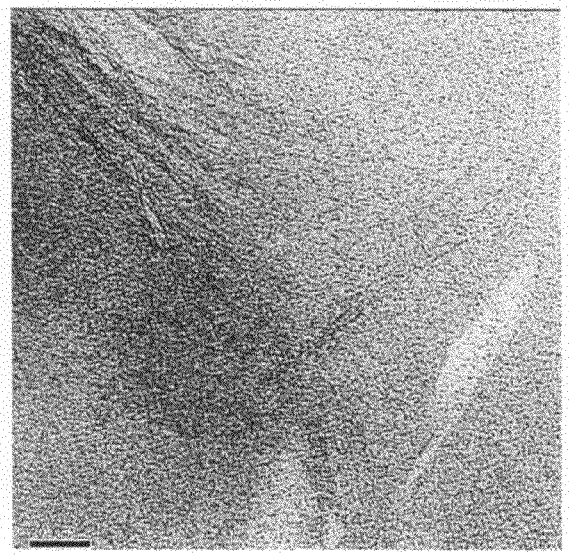
FIG. 1D is a magnified view of an exemplary thermoplastic elastomer composition magnified 97000×.
Figure 2A:
FIG. 2A is a magnified view of an exemplary thermoplastic elastomer composition magnified 2550×.
Figure 2B:
FIG. 2B is a magnified view of an exemplary thermoplastic elastomer composition magnified 71000×.
Figure 2C:
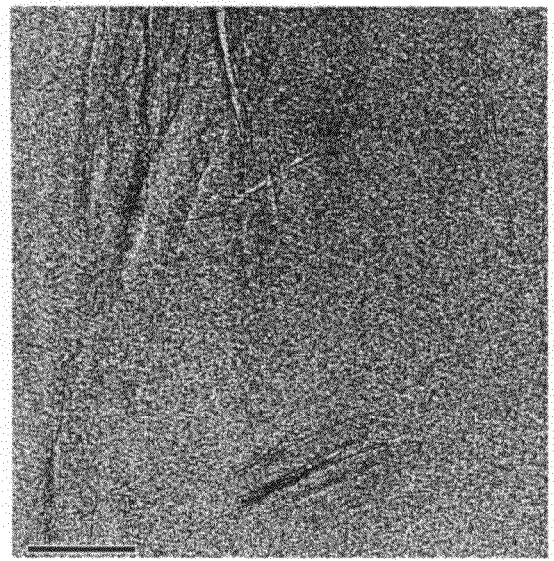
FIG. 2C is a magnified view of an exemplary thermoplastic elastomer composition magnified 71000×.
Figure 2D:
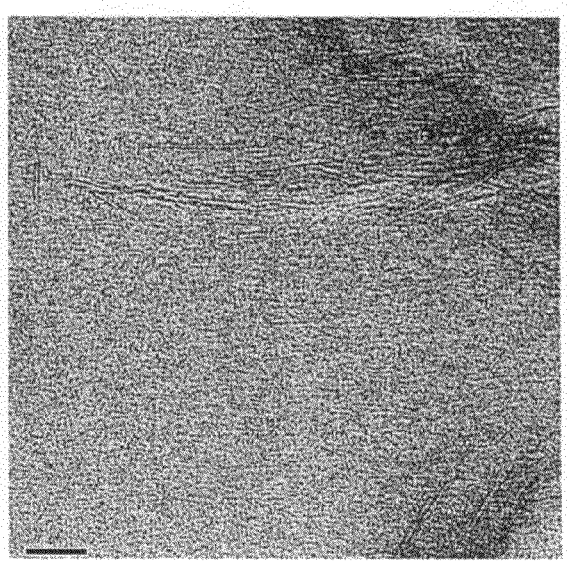
FIG. 2D is a magnified view of an exemplary thermoplastic elastomer composition magnified 97000×.

Preferably, particulate compositions provide small, uniform particle size dispersions, which impart thermoplastic elastomer compositions with favorable physical properties, including for example, improved consistency, extended useful life, reduced oil separation, high temperature performance, high dropping point, oxidation stability, fretting wear protection, and noise reduction. Particulate compositions require low quantities of clay to impart favorable characteristics on thermoplastic elastomer compositions due to the large surface area to volume ratio of the clay particles. However, in one or more embodiments relatively large quantities of particulate material is utilized. Exemplary particulate compositions are described in U.S. Patent Application Publication Nos. 2004/0054059 & 2005/0032937 and U.S. Pat. Nos. 6,103,817, 6,060,549, 6,034,164, 5,973,053, 5,936,023, 5,883,173, 5,807,629, 5,665,183, and 5,576,373, each of which is herein incorporated by reference in its entirety. Exemplary thermoplastic elastomer compositions are shown in FIGS. 1A to 2D. As shown in FIGS. 1A & 2A, the dark regions are clay particles. The dark striated regions shown in FIGS. 1B & 2B are closer views of clay particles shown in FIGS. 1A & 2A, respectively. FIGS. 1C, 1D, 2C, and 2D, respectively, are closer views of the same type of clay particles that have been further exfoliated.

Clays utilized in particulate compositions include swellable layered clay materials such as for example natural or synthetic phyllosilicates, particularly smectic clays such as montmorillonite, nontronite, beidellite, volkonskoite, laponite, hectorite, saponite, sauconite*, magadite, kenyaite, stevensite. Other exemplary clays include vermiculite, halloysite, aluminate oxides, hydrotalcite. Combinations of the above-identified clays may also be utilized.

Clays, i.e., layered clays, are generally composed of particles containing a plurality of silicate platelets tightly bound together at interlayer spacings. Layered clays may contain exchangeable cations that are exchangeable at the interlayer surface. Exchangeable cations include cations known to those skilled in the art. Exemplary cations are $Na^+$, $Ca^{+2}$, $K^+$ or $Mg^{+2}$.

Clay may be intercalated and/or exfoliated by treatment with organic molecules such as for example, swelling agents, or exfoliating agents, capable of undergoing ion exchange reactions with the cations present at interlayer surfaces. As utilized herein "intercalation" is generally the process of achieving small particle platelets wherein the platelets contain layers of clay. As used herein "exfoliation" refers to the process of separating layers of clay that exist in platelets. As used herein "substantial exfoliation" and "full exfoliation" refers to the process of achieving one or more angstrom size layers of clay. Suitable exfoliating agents include cationic surfactants such as ammonium, alkylamines or alkylammonium, e.g., primary, secondary, tertiary and quaternary, phosphonium or sulfonium derivatives of aliphatic, aromatic or arylaliphatic amines, phosphines and sulfides. In one embodiment, the exfoliating agent is a long chain tertiary amine, polysilane, or an alkylamine-exfoliated clay.

Other suitable exfoliating additives include protonated amino acids and salts thereof containing 2-30 carbon atoms such as 12-aminododecanoic acid and epsilon-caprolactam. Suitable swelling agents and processes for intercalating layered silicates are disclosed in U.S. Pat. Nos. 4,472,538, 4,810, 734, 4,889,885, as well as WO92/02582, each of which is herein incorporated by reference in its entirety.

Without being limited by theory, it is believed that treatment of clay with exfoliating agents results in intercalation of the layered platelets as a consequence of a reduction of the ionic forces holding the layers together and introduction of molecules between layers which serve to space the layers. This separation allows the layered silicate to more readily absorb material, i.e., carrier medium, between the layers and facilitates further delamination of the layers when the intercalate is shear mixed with thermoplastic material to provide a uniform dispersion of the exfoliated layers within a matrix of the thermoplastic component and/or the elastomeric component. It has been observed that too much exfoliation provides diminishing returns so that, while maintaining other variables the same, less benefit is achieved by the same quantity of particulate material.

Particulate materials, such as for example clay silicate platelets, typically have a thickness in one direction of less than about 1 millimeter or less than about 0.1 millimeters, or less than about 0.01 millimeters. In some embodiments, particulate materials have a thickness in one direction of less than about 3000 angstroms, or less than about 1500 angstroms (1 $Å=10^{-10}$ m.) or less than about 500 angstroms. Preferably, particulate materials typically have an average thickness of less than about 200 angstroms or less than about 50 angstroms. More preferably, particulate materials typically have an average thickness of from about 3 to about 25 angstroms or from about 3 to about 20 angstroms. Still more preferably, particulate materials typically have a thickness of from about 8 to about 12 angstroms. Particulate size is measured by those techniques known to those skilled in the art such as electron microscopy and atomic force microscopy, e.g., tapping phase atomic force microscopy.

Clay interlayer spacing is generally less than about 500 angstroms. Preferably, interlayer spacing is less than about 50 angstroms. More preferably, interlayer spacing is less than about 15 angstroms. Still more preferably, interlayer spacing is less than about 8, or less than about 4 angstroms.

In one or more embodiments, exfoliating additives are present in thermoplastic elastomer compositions in an amount sufficient to achieve the desirable properties, which is readily determined by those of skill in the art. Thermoplastic elastomer compositions generally include from about 0.1 to about 30 phr of exfoliating additives in one embodiment, and from 0.2 to 20 phr in yet another embodiment, and from 0.3 to 15 phr in yet another embodiment. Preferably, thermoplastic elastomer compositions include from about 0.5 to about 10 weight percent, or from 1.0 to 5.0 weight percent of exfoliating additives.

Polar and apolar polymers utilized as carrier mediums include typical polymers known to those skilled in the art. For example, apolar polymers include polyolefins such as polyethylene, polypropylene, etc. Particulate compositions composed of polymer-based carrier mediums typically provide a lower shear environment compared to the use of oil-based carrier mediums.

The ease of exfoliation/intercalation of particulate materials depends in part on the polarity of the particulate material—carrier medium system. For example, it is more difficult to exfoliate layers of a polar clay with a non-polar carrier medium than it is to separate a polar clay with a polar carrier medium.

Processing oils utilized in particulate compositions include those processing oils known to those skilled in the art. Exemplary processing oils include rubber processing oils, mineral oils, synthetic oils, or combinations thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

Exemplary synthetic oils include polyisobutylene, poly (isobutylene-co-butene), polybutadiene, poly(butadiene-co-butene), and mixtures thereof. In one or more embodiments, synthetic oils may include polylinear α-olefins, polybranched α-olefins, hydrogenated poly-α-olefins, and mixtures thereof.

Useful synthetic oils are commercially available as Polybutene™ from Soltex in Houston, Tex., Indopol™ from BP in Great Britain, and Parapol™ from ExxonMobil Chemical. Oligomeric copolymers deriving from butadiene and its comonomers are commercially available under the tradename Ricon Resin™ (Sartomer).

Processing oil may be added to thermoplastic elastomer compositions as part of the particulate, or as a separate additive. Preferably, at least a portion of the amount of processing oil typically utilized in conventional compositions is replaced by the particulate composition.

The quantity of processing oil utilized depends upon the properties desired and is readily identified by those skilled in the art, with the upper limit depending upon the compatibility of the particular oil and blend ingredients. This limit is exceeded when excessive exuding of extender oil occurs. In view of the oil included in particulate compositions, generally less clay may be introduced when using oil-extended rubber in order to avoid excessive oil in thermoplastic elastomer compositions.

Poly α-olefins are oligomers or low molecular weight polymers of branched and/or linear α-olefins. Poly α-olefins include, for example, paraffins, and dimers, trimers, tetramers, pentamers, etc., of α-olefins, oligomers of α-olefins. Exemplary α-olefins include 1-pentene, 1-hexene, 1-heptene, 1-octene, 1-nonene, 1-decene, 1-undecene and/or 1-dodecene. In a preferred embodiment, the α-olefin is 1-decene.

Preferred poly α-olefins are described more particularly in, for example, U.S. Pat. Nos. 5,171,908, & 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999), each of which is herein incorporated by reference in its entirety. Desirable PAO's are commercially available under the tradename SHF, SuperSyn, and Spectra-Syn PAO's from ExxonMobil Chemical Company in Houston. Other useful poly α-olefins include those sold under the tradenames Synfluid™ available from ChevronPhillips Chemical Co. in Pasedena Tex., Durasyn™ available from BP Amoco Chemicals in London England, Nexbase™ available from Fortum Oil and Gas in Finland, Synton™ available from Crompton Corporation in Middlebury Conn., USA, EMERY™ available from Cognis Corporation in Ohio, USA. Similarly, white synthetic oils are available under the tradename SPECTRASYN™ (ExxonMobil), formerly SHF Fluids (Mobil).

In one or more embodiments poly α-olefins $C_{20}$ to $C_{1500}$ paraffins. Preferably, poly α-olefins are $C_{30}$ to $C_{1000}$ paraffins or $C_{40}$ to $C_{1000}$ paraffins. More preferably, poly α-olefins are $C_{50}$ to $C_{750}$ paraffins or $C_{30}$ to $C_{500}$. Still more preferably, poly α-olefins are $C_{40}$ to $C_{500}$ paraffins or $C_{50}$ to $C_{500}$ paraffins.

In one or more embodiments, poly α-olefins have 5 to 18 carbon atoms. Preferably, poly α-olefins have 5 to 16 carbon atoms, or 5 to 14 carbon atoms. More preferably poly α-olefins have 6 to 12 carbon atoms or 8 to 12 carbon atoms. Still more preferably, poly α-olefins have about 10 carbon atoms.

In one embodiment, poly α-olefins include dimers, trimers, tetramers, pentamers, etc. of $C_5$ to $C_{24}$ α-olefins. Preferably, poly α-olefins include dimers, trimers, tetramers, pentamers, etc. of $C_5$ to $C_{18}$ α-olefins or $C_5$ to $C_{16}$ α-olefins. More preferably, poly α-olefins include dimers, trimers, tetramers, pentamers, etc. of $C_5$ to $C_{14}$ α-olefins or $C_6$ to $C_{12}$ α-olefins. Still more preferably, poly α-olefins include dimers, trimers, tetramers, pentamers, etc. of $C_8$ to $C_{12}$ α-olefins.

In one embodiment, poly α-olefins include oligomers of two or more $C_5$ to $C_{24}$ α-olefins. Preferably, poly α-olefins include oligomers of two or more $C_5$ to $C_{18}$ α-olefins or oligomers of two or more $C_5$ to $C_{16}$ α-olefins. More preferably, poly α-olefins include oligomers of two or more $C_5$ to $C_{14}$ α-olefins or oligomers of two or more $C_6$ to $C_{12}$ α-olefins. Still more preferably, poly α-olefins include oligomers of two or more $C_8$ to $C_{12}$ α-olefins.

Preferred poly α-olefins are characterized in one or more embodiments as having a kinematic viscosity (KV) at 100° C. of 4 cSt or more, preferably 5 cSt or more, preferably 6 cSt or more, preferably 8 cSt or more, preferably 10 cSt or more, more preferably 20 cSt or more, more preferably 30 cSt or more, more preferably 40 cSt or more, preferably 50 cSt or more, preferably 80 cSt or more, preferably 100 cSt or more, preferably 110 or more, preferably 150 cSt or more, preferably 200 cSt or more, preferably 300 cSt or more, preferably 500 cSt or more, preferably 750 or more, preferably 1000 cSt or more, preferably 1500 cSt or more, preferably 2000 cSt or more, still more preferably 2500 or more, preferably 10 cSt to 3000 cSt, preferably 10 cSt to 1000 cSt, still more preferably 10 cSt to 40 cSt.

The kinematic viscosity of poly α-olefins at 100° C. is also characterized as being from of 0.1 to 3000 cSt, more preferably 0.5 to 1000 cSt, more preferably 1 to 250 cSt, more preferably 1 to 200 cSt, more preferably 4 to 500 cSt, more preferably 6 to 300 cSt, more preferably 10 to 500 cSt, more preferably 0.1 to 150 cSt, still more preferably less than 2 cSt.

Preferred poly α-olefins are also characterized in one or more embodiments as having a viscosity index of 90 or more, more preferably 100 or more, more preferably 105 or more, more preferably 110 or more, more preferably 115 or more, more preferably 120 or more, more preferably 125 or more, more preferably 130 or more, more preferably 140 or more, more preferably 150 or more, more preferably 190 or more, more preferably 200 or more, more preferably 250 or more, still more preferably 300 or more, more preferably 90 to 400, still more preferably 120 to 350.

In one or more embodiments, poly α-olefins have a number average molecular weight (Mn) of 100 to 21,000, more preferably 300 to 15,000, more preferably 200 to 10,000, more preferably 200 to 7,000, more preferably 600 to 3,000, more preferably 200 to 2,000, still more preferably 200 to 500 g/mole.

In one or more embodiments, poly α-olefins have a weight average molecular weight Mw of less than 20,000 g/mol, more preferably less than 10,000 g/mol, more preferably less than 5,000 g/mol, more preferably less than 4,000 g/mol, more preferably less than 2,000 g/mol, more preferably less than 500 g/mol, more preferably less than 100 g/mol.

Preferred poly α-olefins are also characterized in one or more embodiments as having a pour point of less than 0° C., more preferably −5° C. or less, more preferably −10° C. or less, more preferably −20° C. or less, still more preferably less than −40° C.

Poly α-olefins may have a dielectric constant at 20° C. of less than 3.0, preferably less than 2.8, more preferably less than 2.5, more preferably less than 2.3, still more preferably less than 2.1.

Poly α-olefins may have a specific gravity (ASTM D 4052, 15.6/15.6° C.) of less than 0.920, more preferably less than 0.910, more preferably less than 0.86, more preferably less than 0.855, more preferably less than 0.85, more preferably 0.650 to 0.900, more preferably 0.700 to 0.860, more preferably 0.750 to 0.855, more preferably 0.790 to 0.850, more preferably 0.800 to 0.840.

In one embodiment, the poly α-olefin is a $C_6$ to $C_{14}$ olefin having a kinematic viscosity of 10 cSt or more at 100° C., and a viscosity index of 120 or more, preferably 130 or more, as determined by ASTM D-2270.

Preferred poly α-olefins have a flash point of 200° C. or more, preferably 220° C., ore more, preferably 230° C. or more, preferably 240° C. or more, preferably 250° C. or more.

Preferably, particulate compositions are clay grease compositions, i.e., clay in grease dispersions, wherein a clay based thickener is utilized to prepare a grease, or grease-like, composition by conventional grease making techniques.

Clay grease compositions include as a major proportion an oil, clay, and optionally a minor proportion of simple or complex soap thickener, organic thickener, or combination thereof. Exemplary clay grease compositions include but are not limited to lithium simple and complex soap greases, calcium simple and complex soap greases, sodium simple and complex greases, aluminium simple and complex greases, barium simple and complex greases; as well as polyurea greases, organo-clay greases and bentonite clay/swelling-clay type thickeners. Clay grease compositions are commercially available as Mobiltemp™ grease products, which are bentonite clay-thickened, synthetic poly-α-olefin oils, from ExxonMobil Corporation in Houston.

Preferably, clay grease dispersions are composed of clay-based thickeners where the clay plus activator components generally replace a least a portion, but preferably all, of the soap compounds utilized in traditionally compositions.

Exemplary clay grease compositions are high performance clay-thickened materials designed for the lubrication of plain and antifriction bearings operating at low speed and high temperature or under cycling conditions from ambient to high temperatures. Such greases use a clay thickener, which, unlike traditional soap thickeners, do not soften at high temperatures. These clay grease compositions are based on a high quality, high viscosity particulate oil and are specially formulated to provide: low volatility and excellent resistance to oxidation at high temperatures, resistance to water washout and good anti-wear performance under heavy loads and low speeds. Such clay greases may optionally also contain molybdenum disulphide for added anti-wear protection.

Particulate compositions are generally prepared by adding the carrier medium and clay into a conventional mixer. Within the mixer, the clay separates into exfoliated particles that become dispersed in the carrier medium. Preferably, an optional plasticizer, exfoliating agent, and/or activator are utilized. Methods of preparing particulate compositions are described in U.S. Pat. No. 6,407,043, which is herein incorporated by reference in its entirety.

Clay grease compositions are prepared with conventional grease preparation techniques known to those skilled in the art. Methods of preparing clay grease compositions include, for example, the steps of (a) agitating and heating the soap-forming or other grease-thickening constituent(s) with at least a portion of the lubricating base oil and clay in a closed reaction vessel over a temperature range and for a period of time sufficient to form a soap or other thickener system. Preferably, at least a portion of the contents of the reaction vessel, are cycled during at least the initial stage of the soap-forming, or other thickening, period, one or more times round a pressure-ventable closed processing loop.

Particulate compositions are generally composed of from about 0.1 to about 99 weight percent clay, based on the weight of the particulate. Preferably, particulate compositions are composed of from about 0.1 to about 65 weight percent clay. More preferably, particulate compositions are composed of from about 4.0 to about 50 weight percent clay. Still more preferably, particulate compositions are composed of from about 5.0 to about 35 weight percent clay.

In one or more embodiments, particulate compositions are composed of from about 6.0 to about 30 weight percent clay. For example, in one embodiment, particulate compositions are composed of about 8.2 weight percent of an intercalated, exfoliated clay. In another embodiment, particulate compositions are clay grease compositions composed of a synthetic paraffinic oil with about 16 weight percent intercalated, exfoliated clay.

Thermoplastic elastomer compositions may optionally include conventional additives in addition to the particulate compositions. Conventional additives include, for example, processing oils, clays, polymeric processing additives, functionalized tackifier resins, reinforcing and non-reinforcing fillers, antioxidants, stabilizers, lubricants, anti-blocking agents, anti-static agents, waxes, foaming agents, pigments, flame retardants, and combinations thereof.

Polymeric processing additives include polymeric resins that have a high melt flow index, such as for example, both linear and branched polymers that have a melt flow rate of at least about 500 dg/min, at least about 750 dg/min, at least about 1000 dg/min, at least about 1200 dg/min, or at least about 1500 dg/min.

Mixtures of both linear and branched polymeric processing additives and combinations thereof may be employed. Linear polymeric processing additives include, for example, polypropylene homopolymers, and branched polymeric processing additives include, for example, diene-modified polypropylene polymers.

Functionalized tackifier resins, which may also be referred to as a functionalized hydrocarbon resin, include at least one functional group. The functional group, which may also be referred to as a functional substituent or functional moiety, includes a hetero atom. In one or more embodiments, the functional group includes a polar group. Examples of polar groups include hydroxy, carbonyl, ether, halide, amine, imine, nitrile, or isocyanate groups. Exemplary groups containing a carbonyl moiety include carboxylic acid, anhydride, ketone, acid halide, ester, amide, or imide groups, and derivatives thereof.

In one embodiment, functional groups include a succinic anhydride group, or corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon resin. Functionalized tackifier resins include grafted hydrocarbon resins as disclosed in U.S. Patent Publication Nos. 2004/0260021 A1 and 2004/0266947 A1, which are each herein incorporated by reference in their entireties.

Other exemplary tackifer resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In embodiments including a functionalized tackifier resin, thermoplastic elastomer compositions include, based on 100 parts of elastomeric component, from about 1 to about 50, or from about 7 to about 40, and in other embodiments from about 15 to about 35 functionalized tackifier resin.

Other fillers and extenders that may be utilized include conventional inorganics such as calcium carbonate, silica, talc, titanium dioxide, carbon black, and others known to those skilled in the art. Preferably, carbon black is employed in thermoplastic elastomer compositions. The amount of carbon black that is utilized depends, at least in part, upon the type of carbon black and the amount of process oil that is used.

Methods of preparing the present thermoplastic elastomer compositions includes the steps of providing a thermoplastic component, providing an elastomeric component, providing a particulate composition, and combining the thermoplastic component, elastomeric component, and particulate composition to form a thermoplastic elastomer composition. Particulate compositions are combined with the thermoplastic component, the elastomeric component, or a combination of both the thermoplastic component and the elastomeric component. Particulate compositions may be added to the thermoplastic component and/or elastomeric component before or after the elastomeric component and thermoplastic component are combined. In one or more embodiments, two or more particulate compositions are combined with the thermoplastic and elastomer components.

Preferably, the particulate compositions are added in portions during multiple processing steps. For example, one or more portions of the particulate composition may be initially combined with the thermoplastic and elastomeric components, and then a second portion may be added prior to the addition of a curing agent. Additional portions of the particulate composition may be added with the curing agent, and/or afterward addition of the curing agent. Each portion of the particulate composition may be the same or different.

Thermoplastic components and elastomeric components are provided by techniques known to those skilled in the art, such as for example conventional synthesis techniques and purchasing commercial embodiments.

Propylene polymers are prepared for example via polymerization reactions known to those skilled in the art. For example, homopolymerization of propylene occurs in a single stage or multiple stage reactor. Similarly, copolymers are obtained by copolymerizing propylene and comonomers in a single stage or multiple stage reactor.

Polymerization methods include high pressure, slurry, gas, bulk, solution phase, or a combination thereof, using a traditional Ziegler-Natta catalyst or a single-site catalyst, including for example vanadium catalysts, Group IV-VI metallocenes, and Brookhart catalysts. The catalyst is fed to the reactors either separately or premixed.

Polymerization may be carried out by a continuous or batch process and may include use of chain transfer agents, scavengers, or other such additives as deemed applicable by those skilled in the art. Methods for making and using single site catalysts are well known in the art. Exemplary metallocene catalysts are described in U.S. Pat. Nos. 4,530,914 and 5,391,790, each of which is herein incorporated by reference in its entirety. In a preferred embodiment, thermoplastic elastomer compositions are prepared in series reactors, which are known to those skilled in the art.

Exemplary polymerization reactions are conducted by reacting monomers in the presence of a catalyst system at a temperature of from about −50 degrees Celsius to about 200 degrees Celsius for a time sufficient to form the subject polymer, e.g., from about 1 second to about 10 hours to produce a polymer having a weight average molecular weight of from about 5,000 or less to about 1,000,000 or more and a molecular weight distribution of from about 1.9 to about 4.5.

While methods of preparing polymers include utilizing a catalyst system in the liquid phase (slurry, solution, suspension or bulk phase or combination thereof), gas phase polymerization may also be utilized. When utilizing a gas phase, slurry phase, or suspension phase polymerization, the catalyst systems will preferably be a supported catalyst. Exemplary catalysts are described in U.S. Pat. No. 5,057,475, which is herein incorporated by reference in its entirety.

The thermoplastic and elastomeric components are prepared and then combined by any technique that provides an intimate mixture of components. For example, the thermoplastic and elastomeric components are combined by melt pressing/folding/rolling, melt blending, solution blending, continuous mixing in single and twin screw mixing extruders, utilizing static mixers for mixing molten polymer streams of low viscosity, or impingement mixers. Mixing is complete when the blend exhibits a substantial homogeneous morphology of thermoplastic and elastomeric components. In some embodiments, particulate compositions are prepared by suspending a particulate material in liquid monomer and then forming a polymer via polymerization.

In some embodiments, the thermoplastic and elastomeric components are blended by polymerization in series reactors, i.e., multi-stage polymerization. As used herein, "series reactor" and "multi-stage reactor" are used interchangeably. Multi-stage polymerization techniques utilize at least two reactors known to those skilled in the art, such as for example, two or more continuous flow, stirred tank reactors in series. Multi-stage polymerization methods provide broad control over (a) the amount of components, (b) the component composition, and (c) component molecular weight. Exemplary multi-stage reactor systems are disclosed in U.S. Pat. Nos. 6,319,998, 4,016,342, and 4,306,041, each of which is herein incorporated by reference in its entirety.

Preferably, the catalyst system is a metallocene catalyst. For example, the catalyst may be a cyclopentadienyl metallocene complex which has two cyclopentadienyl ring systems for ligands or monocyclopentadienyl metallocene catalyst. The metallocene complexes are activated with an alumoxane, e.g. methylalumoxane (MAO), or a non-coordinating anion (NCA). Optionally, a catalyst scavenger, such as for example a trialkyl aluminum, may be added to the reactor feed(s) to prevent catalyst deactivation.

Polymerization reactors are preferably cooled by reactor jackets or cooling coils, autorefrigeration, prechilled feeds, or combinations of each. Reactor cooling induces a temperature difference between reactors which is helpful for controlling polymer molecular weight.

Reactor temperature depends upon the influence of temperature on catalyst deactivation rate and polymer properties. Reaction temperatures preferably do not exceed the temperature at which the concentration of catalyst in the second reactor is insufficient to make the desired polymer component in the desired amount.

An exfoliating additive may optionally be utilized at any stage of manufacture. For example, exfoliating agent can be combined with the particulate before or after the particulate is combined with the thermoplastic and elastomeric components. Preferably, the clay is pre-treated with the exfoliating additive prior to addition to the thermoplastic and elastomeric phases.

After the elastomeric component is dispersed in the thermoplastic component, the elastomeric component is optionally cured, or crosslinked, by dynamic vulcanization. As used herein "dynamic vulcanization" means a vulcanization or curing process for elastomers and rubbers contained in a composition containing a thermoplastic component, wherein the elastomer or rubber is partially or substantially crosslinked or vulcanized under conditions of high shear at a temperature above the melting point of the thermoplastic. The elastomeric component may be cured before or after addition of a particulate. Additional additives, such as for example additional thermoplastic resin or tackifier resins, may be added after dynamic vulcanization. Preferably, the elastomeric component is highly cured, i.e., substantially completely cured. As used herein, the terms "fully vulcanized" and "fully cured" or "fully crosslinked" mean that the rubber component has been cured or crosslinked to a state in which the elastomeric properties of the crosslinked rubber are similar to those of the rubber in its conventional vulcanized state, apart from the thermoplastic elastomer composition.

Dynamically cured compositions, notwithstanding the fact that the rubber component is partially or fully cured, may be processed and reprocessed by conventional plastic processing techniques such as extrusion, injection molding and compression molding. Scrap or flashing can be salvaged and reprocessed.

The degree of curing can be measured by determining the amount of elastomer that is extractable from the thermoplastic elastomer composition by using cyclohexane or boiling xylene as an extractant. This method is disclosed in U.S. Pat. No. 4,311,628, which is herein incorporated by reference in its entirety. Preferably, the degree of curing is substantially complete so that not more than about 20 weight percent of elastomer is extractable by cyclohexane at 23° C. as described in U.S. Pat. Nos. 5,100,947 and 5,157,081, each herein incorporated by reference in there entireties. More preferably, not more than about 6 weight percent, or not more than about 5 weight percent of elastomer is extractable by cyclohexane. Still more preferably, not more than about 3 weight percent of elastomer is extractable by cyclohexane.

Alternatively, in one or more embodiments, the elastomeric component has a degree of cure such that the crosslink density is at least $4 \times 10^{-5}$, or at least $7 \times 10^{-5}$, and in other embodiments at least $10 \times 10^{-5}$ moles per milliliter of elastomeric component as described in "Crosslink Densities and Phase Morphologies in Dynamically Vulcanized TPEs," by Ellul et al., 68 *Rubber Chemistry and Technology* 573-584 (1995), which is herein incorporated by reference in its entirety.

The elastomeric component is cured by curing agents known to those skilled in the art. For example, where the elastomeric component includes an olefinic elastomeric copolymer, the cure agent may include peroxides, phenolic resins, free radical curatives, silicon-containing curatives (sometimes referred to as "hydrosilylation agents"), or other curatives conventionally employed. In embodiments where the elastomeric component includes butyl rubber the cure agents are preferably phenolic resins, silicon-containing curing systems, zinc oxide systems, or amine systems. The curing agent is present in an amount effective to produce the desired amount of cure within the elastomeric component.

Phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. An example of a phenolic resin curative includes that defined according to the general formula

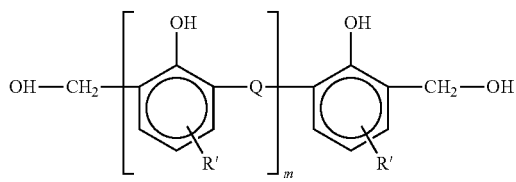

where Q is a divalent radical selected from the group consisting of $-CH_2-$, $-CH_2-O-CH_2-$; m is zero or a positive integer from 1 to 20 and R' is an organic group. In one embodiment, Q is the divalent radical $-CH_2-O-C_lH_2-$, m is zero or a positive integer from 1 to 10, and R' is an organic group having less than 20 carbon atoms. In other embodiments, m is zero or a positive integer from 1 to 5 and R' is an organic radical having between 4 and 12 carbon atoms. In one or more embodiments, phenolic resins are utilized in conjunction with a halogen source, e.g., stannous chloride, metal oxide, or reducing compound, e.g., zinc oxide.

Phenolic resins are commercially available under the tradenames SP-1044 and SP-1045 from Schenectady International in Schenectady, N.Y., which may be referred to as alkylphenol-formaldehyde resins.

Where a phenolic resin curative is employed, vulcanization is accomplished with from about 0.5 to about 20 parts by weight curative resin, based on the total weight of the elastomeric phase. In other embodiments, vulcanization is accomplished with from about 1.0 to about 16 parts, or from about 3 to about 12 parts by weight curative resin.

In one embodiment, the elastomeric component is simultaneously cured and dispersed as fine particles within the thermoplastic component, although other morphologies may also exist. Dynamic vulcanization may be effected by mixing the elastomeric component at elevated temperature in conventional mixing equipment known to those skilled in the art such as, for example, roll mills, stabilizers, Banbury mixers, Brabender mixers, continuous mixers, and mixing extruders.

Despite the fact that the elastomeric component may be partially or fully cured, thermoplastic elastomer compositions may be processed and reprocessed by conventional plastic processing techniques such as thermoforming operations, extrusion, injection molding, blow molding, injection-compression molding, compression molding, and rotational molding. The elastomeric component within thermoplastic elastomer compositions may be in the form of finely-divided and well-dispersed particles of vulcanized or cured rubber within a continuous thermoplastic phase or matrix. In other embodiments, a co-continuous morphology or a phase inversion is achieved.

In embodiments where the cured elastomeric component is in the form of finely-divided and well-dispersed particles within the thermoplastic component, particles of elastomeric component have an average diameter of less than about 500 μm. Preferably, elastomeric component particles have an average diameter of less than about 50 μm, or less than about 30 μm. More preferably, elastomeric component particles have an average diameter of less than about 10 μm, or less than about 5 μm. In one or more embodiments, elastomeric component particles have an average diameter of less than about 1 μm.

In other embodiments, at least about 50% of elastomeric component particles have an average diameter of less than about 5 μm. Preferably, at least about 60% of elastomeric component particles have an average diameter of less than about 2 μm. More preferably, at least about 70% of elastomeric component particles have an average diameter of less than about 1 μm.

Thermoplastic elastomer compositions are useful for manufacturing articles or devices of commerce known to those skilled in the art. For example, articles and devices for consumer and industrial applications have advantageous properties when formed from thermoplastic elastomer compositions. Exemplary articles include automobile parts, including exterior and interior trim pieces, instrument panels, interior knee pads, brake parts such as cups, coupling disks and diaphragm cups, boots for constant velocity joints and rack and pinion joints, hydraulically or pneumatically operated equipment parts, body plugs and door panels. Other industrial uses include o-rings, valve seats, and valve guides. Consumer applications include grips or gripable surfaces on a number of consumer goods including, for example, kitchen utensils, tools, toothbrushes, pens and pencils, and athletic equipment. Thermoplastic elastomer compositions may also be used in numerous damping applications such as in the formation of gaskets, bumpers, housings, and motor mounts. Further applications may include, for example, seals, including weather seal components, in the automotive, and construction industries, furniture spacers, and cable grommets. Other applications may include hoses, belts, boots, and elastic fibers.

In other embodiments, also provided are:

A. A thermoplastic elastomer composition comprising:
 a thermoplastic component,
 an elastomeric component, and
 at least one particulate composition comprising:
  a carrier medium, and
  a particulate material having a thickness in one direction of less than about 3000 angstroms and is dispersed in the carrier medium,
wherein the particulate composition is dispersed within the thermoplastic elastomer composition B. The thermoplastic elastomer composition of embodiment A, wherein the particulate composition is dispersed within the elastomeric component.

C. The thermoplastic elastomer composition of embodiment A or B, wherein the carrier medium is polar.

D. The thermoplastic elastomer composition of any of embodiments A-C, wherein the carrier medium is apolar and comprises a polymer, an oil, a poly α-olefin, or combinations thereof.

E. The thermoplastic elastomer composition of any of embodiments A-C, wherein the carrier medium is a blend of polar and apolar materials comprising a polymer, an oil, a poly α-olefin, or combinations thereof.

F. The thermoplastic elastomer composition of any of embodiments A-E, wherein the particulate material is a mineral, a mineral compound, a clay, carbon particles, nanotubes, or combination thereof.

G. The thermoplastic elastomer composition of any of embodiments A-F, wherein the particulate material is an intercalated and exfoliated clay.

H. The thermoplastic elastomer composition of any of embodiments A-G, wherein the particulate material is a natural or synthetic phyllosilicate, smectic clay, montmorillonite, nontronite, beidellite, volkonskoite, laponite, hectorite, saponite, sauconite, magadite, kenyaite, stevensite, vermiculite, halloysite, aluminate oxides, hydrotalcite, or combination thereof.

I. The thermoplastic elastomer composition of any of embodiments A-H, wherein the particulate material has a thickness in one direction of less than about 50 angstroms.

J. The thermoplastic elastomer composition of any of embodiments A-H, wherein the particulate material has a thickness in one direction of from about 3 to about 20 angstroms.

K. The thermoplastic elastomer composition of any of embodiments A-J, wherein a portion of the elastomeric component is cured.

L. The thermoplastic elastomer composition of any of embodiments A-K, wherein the at least one particulate composition is a clay grease composition comprising:
 a carrier medium, and
 clay particles dispersed in the carrier medium.

M. The thermoplastic elastomer composition of any of embodiments A-L, wherein the at least one particulate composition comprises from about 0.1 to about 65 weight percent clay, based upon the total weight of the particulate composition.

N. The thermoplastic elastomer composition of any of embodiments A-M, wherein the carrier medium is a poly α-olefin.

O. The thermoplastic elastomer composition of any of embodiments A-N, wherein the at least one particulate composition comprises:
 a first clay grease composition, and
 a second clay grease composition,
wherein each of the first clay grease composition and the second clay grease composition are dispersed within the thermoplastic component, the elastomeric component, or both the thermoplastic component and the elastomeric component.

P. A method of preparing thermoplastic elastomer compositions comprising:
 a. providing a thermoplastic component,
 b. providing an elastomeric component, and
 c. combining the thermoplastic component and elastomeric component with at least one particulate composition comprising:
  a carrier medium, and
  a particulate material having a thickness in one direction of less than about 3000 angstroms and is dispersed in the carrier medium,
wherein the particulate composition is dispersed within the thermoplastic component, the elastomeric component, or both the thermoplastic component and the elastomeric component.

Q. The method of preparing a thermoplastic elastomer composition of embodiment P, further comprising the step of curing the elastomeric component.

R. The method of preparing a thermoplastic elastomer composition of embodiment Q, wherein the curing step occurs prior to combining the thermoplastic component and elastomeric component with the particulate composition.

S. The method of preparing a thermoplastic elastomer composition of embodiment R or S, wherein the curing step dynamically vulcanizes the thermoplastic elastomer composition.

T. The method of preparing a thermoplastic elastomer composition of any of embodiments P-S, wherein the particulate material is a mineral, a mineral compound, a clay, carbon particles, nanotubes, or combination thereof.

U. The method of preparing a thermoplastic elastomer composition of any of embodiments P-T, wherein the at least one particulate composition comprises from about 0.1 to about 65 weight percent clay, based upon the total weight of the particulate composition.

V. The method of preparing a thermoplastic elastomer composition of any of embodiments P-U, wherein the particulate composition is a clay grease composition.

W. The method of preparing a thermoplastic elastomer composition of any of embodiments P-S, wherein the at least particulate composition comprises:
 a first clay grease composition, and
 a second clay grease composition,
wherein each of the first clay grease composition and the second clay grease composition are independently dispersed within the thermoplastic component, the elastomeric component, or both the thermoplastic component and the elastomeric component.

X. The method of preparing a thermoplastic elastomer composition of embodiment W, wherein the first clay grease composition is combined with the thermoplastic component and elastomer component prior to a curing step and the second grease composition is combined with the thermoplastic component and elastomer component after the curing step.

Y. An article prepared from the composition or method of any of embodiments A-X.

The entire above description is intended to be illustrative, and should not be considered limiting. Persons skilled in the art will recognize that various modifications may be made without departing from the spirit and scope of the invention. Accordingly, this description will be deemed to include all such modifications that fall within the appended claims and their equivalents.

EXAMPLES

The following examples, which are not intended to be limiting, present certain embodiments and advantages of thermoplastic elastomer compositions. Unless otherwise indicated, any percentages are on a weight basis.

For purposes of the examples, the following test procedures were used. "Hardness" is the hardness of the TPV measured according to ISO-868. Ultimate tensile strength (UTS), Elongation, and Modulus were measured according to ISO-37. Tear strength was measured according to ISO-34. Compression set was measured according to ISO-815 (type B). Surface roughness was measured according to ISO-4288.

The following general procedure was used to prepare thermoplastic elastomer compositions. A thermoplastic component and an elastomeric component were combined in a Banbury batch mixer operating at 170 rpm and 200° C. Then a particulate was added to the mixer. Optional additives were introduced after the particulate was added. The elastomeric phase was then cured. Mixing continued for about 3 minutes. A second part of the particulate was then added and mixed for 1-2 minutes. The thermoplastic elastomer composition was removed and samples were injection molded into test strips.

The chemical components used in the following examples include:

| | |
|---|---|
| EPDM rubber I | Vistalon ® 3666N (ExxonMobil Chemical) (56.5 wt. % ethylene, 2.0 wt. % ethylidene norbornene) (75 phr extender oil) (44 Mooney visc. (1 + 4) @ 125° C.) |
| EPDM rubber II | Vistalon ® 7500 (ExxonMobil Chemical) (64.0 wt. % ethylene, 4.5 wt. % ethylidene norbornene) (82 Mooney visc. (1 + 8) @ 125° C.) (no extender oil) |
| Polypropylene I | BC245 MO Borealis (impact copolymer, MFR 3.5 g/10 min (230° C./2.16 kg)) |
| Polypropylene II | HA507 MO Borealis (homopolymer, MFR 0.8 g/10 min (230° C./2.16 kg)) |
| Polypropylene III | HF136 MO Borealis (homopolymer, MFR 20 g/10 min (230° C./2.16 kg)) |
| Process oil | Sunpar 150 (Sunoco Chemicals) |
| Clay | Polestar ® 200P(Imerys, calcined kaolin) |
| Particulate I | Mobiltemp ® 1 (Mobil Oil Corp.)(intercalated, exfoliated clay, 8.2 wt. %) |
| Particulate II | Prepared clay-thickened grease (synthetic paraffinic oil with intercalated, exfoliated clay, 16.0 wt. %) |
| ZnO | Zinc oxide; a cross link co-agent |
| SnCl2 | Anhydrous stannous chloride; a cross link co-agent |
| Peroxide curative | DHBP 45 IC1 (Degussa)(2,5-bis(tert-butylperoxy)-2,5-dimethylhexane) (45 wt. % on kaolin) |
| Peroxide co-agent | SARTOMER ® 350 (Sartomer Co.)(1,1,1-trimethylpropane trimethacrylate) |
| Phenolic resin | 30% SP1045 (Schenectady) diluted with paraffinic oil |
| Wax | Okerin ™ (Astorwax, paraffinic wax) |
| Anti-oxidant | Irganox ® 1010 (CIBA Specialty Chemicals) |

Example 1

Three thermoplastic elastomer compositions were prepared and compared to conventional composition that did not include a particulate. Composition nos. 1C-5 were prepared with the components identified below in Table 1. A phenolic resin curing agent was utilized to vulcanize the elastomeric component of the compositions. In the following examples, the letter "C" designates a conventional composition, i.e., a "comparable".

TABLE 1

Formulations (wt. %)

| | Composition No. | | | | |
|---|---|---|---|---|---|
| | 1C | 2C | 3 | 4 | 5 |
| EPDM rubber I | 48.05 | 52.36 | 52.36 | 48.05 | 48.05 |
| Polypropylene I | 6.75 | 7.36 | 7.36 | 6.75 | 6.69 |
| Clay | 8.24 | — | — | 5.25 | 5.20 |
| Process Oil | 33.53 | 36.54 | — | — | — |
| Particulate I | — | — | 36.54 | 36.53 | 36.22 |
| ZnO | 0.55 | 0.60 | 0.60 | 0.55 | 0.54 |
| SnCl$_2$ | 0.35 | 0.38 | 0.38 | 0.35 | 0.35 |
| Wax | 0.96 | 1.05 | 1.05 | 0.96 | 0.95 |
| Phenolic resin | 1.57 | 1.71 | 1.71 | 1.57 | 1.99 |
| Total | 100 | 100 | 100 | 100 | 100 |

As identified below in Table 2 the physical properties of compositions IC-5 were measured.

TABLE 2

Physical Properties

| | Composition No. | | | | |
|---|---|---|---|---|---|
| | 1C | 2C | 3 | 4 | 5 |
| Hardness, 15s (ShA)[1] | 30.4 | 29.5 | 30.4 | 28.9 | 29.2 |
| UTS-Peak stress (MPa)[2] | 1.68 | 1.67 | 2.01 | 1.69 | 1.81 |
| Elongation @ break (%)[2] | 335.9 | 315.4 | 531.5 | 637.1 | 602.3 |
| Modulus 10% (MPa)[2] | 0.16 | 0.15 | 0.22 | 0.19 | 0.18 |
| Modulus 20% (MPa)[2] | 0.25 | 0.24 | 0.30 | 0.28 | 0.26 |
| Modulus 50% (Mpa)[2] | 0.42 | 0.40 | 0.47 | 0.42 | 0.42 |
| Modulus 100% (Mpa)[2] | 0.63 | 0.60 | 0.68 | 0.60 | 0.60 |
| Modulus 300% (MPa)[2] | 1.60 | 1.63 | 1.44 | 1.17 | 1.22 |
| Tear strength unnicked (kN/m)[3] | 9.0 | 8.0 | 11.9 | 11.2 | 11.9 |
| Tear strength nicked (kN/m)[3] | 5.9 | 5.0 | 9.2 | 9.0 | 9.2 |
| LCR viscosity @ 1200 s-1, 204° C. (Pa · s) | 65.5 | 60.6 | 66.1 | 64.5 | 66.2 |
| Compression set @ RT (%)[4] | 18.6 | 17.0 | 27.9 | 27.9 | 28.1 |
| Compression set @ 70° C. (%)[4] | 39.5 | 33.4 | 52.6 | 55.0 | 56.6 |
| Compression set @ 100° C. (%)[4] | 50.6 | 40.0 | 66.3 | 71.5 | 72.0 |
| Surface roughness-Ra value (μinch)[5] | 57.3 | 33.1 | 17.5 | 26.78 | 32.15 |
| Surface roughness-Ra value (μm)[5] | 1.45 | 0.84 | 0.44 | 0.68 | 0.82 |

As shown in Table 2, the mechanical tensile properties and tear resistance of thermoplastic elastomer compositions are improved compared to the conventional compositions. For example, while maintaining the identified tensile properties compositions 3-5 exhibited improved tear strength when unnicked or nicked compared to the conventional composition. The thermoplastic elastomer compositions also exhibit improved surface roughness characteristics compared to the conventional compositions.

Example 2

Five thermoplastic elastomer compositions were prepared and compared to conventional compositions that did not include a particulate. Composition nos. 6C-12 were prepared with the components identified below in Table 3. The compositions of example 2 were prepared as in Example 1, however, the elastomeric phase of Example 1 was replaced with a non-oil extended rubber, Vistalon® 7500.

TABLE 3

Formulations (wt. %)

| | Composition No. | | | | | | |
|---|---|---|---|---|---|---|---|
| | 6C | 7C | 8 | 9 | 10 | 11 | 12 |
| EPDM rubber II | 32.66 | 31.51 | 31.51 | 31.34 | 31.51 | 31.51 | 31.51 |
| Clay | — | 3.54 | — | — | — | — | — |
| ZnO | 0.65 | 0.63 | 0.63 | 0.63 | 0.61 | 0.63 | 0.61 |
| SnCl$_2$ | 0.41 | 0.40 | 0.40 | 0.40 | 0.40 | 0.80 | 0.8 |
| Polypropylene II | 7.84 | 7.56 | 7.56 | 7.52 | 7.33 | 7.51 | 7.29 |
| Polypropylene III | 4.90 | 4.73 | 4.73 | 4.70 | 4.59 | 4.70 | 4.56 |
| Phenolic resin | 2.06 | 1.99 | 1.99 | 2.50 | 3.97 | 1.99 | 3.97 |
| Process oil | 51.48 | 49.65 | — | — | — | — | — |
| Particulate I | — | — | 53.19 | 52.91 | 51.59 | 52.87 | 51.27 |
| Total | 100 | 100 | 100 | 100 | 100 | 100 | 100 |

As identified below in Table 4 the physical properties of compositions 6C-12 were measured.

TABLE 4

Physical Properties

| | Composition | | | | | | |
|---|---|---|---|---|---|---|---|
| | 6C | 7C | 8 | 9 | 10 | 11 | 12 |
| Hardness, 15s (ShA) | 46.6 | 46.8 | 45.2 | 45.9 | 51.6 | 52.5 | 54.0 |
| UTS-Peak stress (MPa) | 2.37 | 1.98 | 1.61 | 1.61 | 2.67 | 2.49 | 3.33 |
| Elongation @ break (%) | 352.8 | 332.7 | 555.3 | 554.8 | 552.4 | 527.3 | 425.7 |
| Modulus 10% (MPa) | 0.32 | 0.33 | 0.48 | 0.45 | 0.80 | 0.82 | 0.82 |
| Modulus 20% (MPa) | 0.53 | 0.55 | 0.66 | 0.62 | 0.89 | 0.91 | 0.92 |
| Modulus 50% (MPa) | 0.82 | 0.83 | 0.90 | 0.86 | 1.07 | 1.08 | 1.12 |
| Modulus 100% (MPa) | 1.12 | 1.10 | 1.11 | 1.08 | 1.29 | 1.28 | 1.40 |
| Tear strength unnicked (kN/m) | 13.5 | 12.9 | 14.2 | 15.5 | 16.9 | 15.5 | 16.1 |
| Tear strength nicked (kN/m) | 7.7 | 8.6 | 10.3 | 10.8 | 10.6 | 10.4 | 9.8 |
| LCR viscosity @ 1200 s-1, 204° C. (Pa · s) | 62.8 | 63.5 | 67.2 | 67.3 | 81.3 | 71.4 | 86.9 |
| Compression set @ RT (%) | 20.9 | 29.5 | 44.4 | 39.9 | 32.3 | 37.2 | 26.7 |
| Compression set @ 70° C. (%) | 46.3 | 55.2 | 71.4 | 72.9 | 63.7 | 65.7 | 47.5 |
| Compression set @ 100° C. (%) | 63.2 | 73.3 | 94.2 | 93.1 | 84.8 | 86.5 | 54.2 |
| Surface roughness-Ra value (μinch) | 55.81 | 56.36 | 34.86 | 17.55 | 21.15 | 24.86 | 25.72 |
| Surface roughness-Ra value (μm) | 1.42 | 1.43 | 0.89 | 0.45 | 0.54 | 0.63 | 0.65 |

As shown in Table 4, utilizing a non-oil extended rubber permitted the use of more particulate. The resulting compositions were harder. For example, compositions 9-12 illustrate that increasing the amount of curing agent and/or co-agents provides thermoplastic elastomer compositions having a compression set similar to fully cross-linked compositions without clay particles while at the same time improving surface roughness. Similar to Example 1, compositions 8-12 exhibit improvements in tensile strength, tear resistance, and surface roughness.

Without being limited by theory, it is believed that at some concentrations of particulate compositions interference with the curing agent and curing kinetics occurs. Interference is alleviated in some circumstances by increasing the quantity of curing agents utilized.

Example 3

Four thermoplastic elastomer compositions were prepared and compared to conventional compositions that did not include a particulate. Composition nos. 13C-20 were prepared with the components identified below in Table 5. Compositions 13C-20 were prepared as in Example 1, except that peroxide curative/co-agent was utilized.

After initially mixing the thermoplastic component and elastomeric component and heating the mixture to about 200° C., one third of the oil and/or particulate was added and mixed until the temperature again reached 200° C. The peroxide curative was then added and mixed for about 2-3 minutes to allow the temperature to again rise. Over about 2 minutes two equal portions of the remaining ⅔ the oil and/or particulate were added and mixed. The product was then collected and samples taken.

include a particulate. The compositions were prepared with different curing systems to determine whether either crosslinking system would interfere with the particulate composition.

TABLE 5

Formulations (wt. %)

| | Composition No. | | | | | | | |
|---|---|---|---|---|---|---|---|---|
| | 13C | 14 | 15C | 16 | 17C | 18 | 19C | 20 |
| EPDM II | 30.66 | 31.04 | 28.33 | 28.54 | 29.92 | 30.28 | 27.70 | 27.90 |
| Clay | 4.66 | — | 11.90 | 8.04 | 4.54 | — | 11.63 | 7.86 |
| Peroxide curative | 2.73 | 2.76 | 2.52 | 2.54 | 4.32 | 4.37 | 4.00 | 4.03 |
| Peroxide co-agent | 1.23 | 1.24 | 1.13 | 1.14 | 1.94 | 1.97 | 1.80 | 1.81 |
| Polypropylene II | 7.35 | 7.44 | 6.80 | 6.85 | 7.18 | 7.26 | 6.64 | 6.69 |
| Polypropylene III | 4.60 | 4.66 | 4.25 | 4.28 | 4.49 | 4.54 | 4.16 | 4.19 |
| Anti-oxidant | 0.46 | 0.47 | 0.42 | 0.43 | 0.45 | 0.45 | 0.42 | 0.42 |
| Process oil | 48.32 | — | 44.65 | — | 47.15 | — | 43.65 | — |
| Particulate I | — | 52.40 | — | 48.18 | — | 51.12 | — | 47.10 |
| Total | 100 | 100 | 100 | 100 | 100 | 100 | 100 | 100 |

Micrographs of composition 14 are shown in FIGS. 1A-D. Micrographs of Sample 18 are shown in FIGS. 2A-D. Although relatively larger clay particles are observed in FIGS. 1A, 1B, 2A, and 2B (see larger black spots), without being limited by theory it is believed that these larger particles originate from the peroxide carrier and are not representative of particles originating from clay grease compositions. As identified below in Table 6 physical properties of compositions 13C-20 were measured.

Composition nos. 21C, 22, 23, 24C, and 25 were prepared with the components identified below in Table 7. Compositions 21C, 22, 23, 24C, and 25 were prepared as in Example 3, except that compositions 22, 23, and 25 were prepared with a higher concentration of exfoliated clay, i.e., Particulate II. The thermoplastic elastomer compositions were cured with a peroxide curing agent or a phenolic curing agent.

Particulate II was prepared by a cold batch grease making process, i.e., no heat was added during preparation. First,

TABLE 6

Physical Properties

| | Composition No. | | | | | | | |
|---|---|---|---|---|---|---|---|---|
| | 13C | 14 | 15C | 16 | 17C | 18 | 19C | 20 |
| Hardness, 15s ShA) | 45.0 | 51.9 | 47.0 | 50.6 | 50.9 | 55.6 | 54.1 | 56.4 |
| UTS-Peak stress (MPa) | 2.47 | 2.91 | 2.56 | 2.75 | 2.75 | 2.7 | 3.17 | 2.89 |
| Elongation @ break (%) | 286.6 | 336.6 | 288.9 | 355.2 | 193.0 | 240.80 | 225.5 | 260.7 |
| Modulus 10% (MPa) | 0.77 | 0.54 | 0.39 | 0.83 | 0.82 | 0.56 | 0.43 | 0.91 |
| Modulus 20% (MPa) | 0.85 | 0.73 | 0.57 | 0.93 | 0.96 | 0.78 | 0.67 | 1.05 |
| Modulus 50% (MPa) | 1.06 | 1.04 | 0.89 | 1.14 | 1.29 | 1.18 | 1.13 | 1.36 |
| Modulus 100% (MPa) | 1.38 | 1.37 | 1.28 | 1.42 | 1.80 | 1.6 | 1.71 | 1.74 |
| Tear strength unnicked (kN/m) | 12.2 | 14.2 | 12.1 | 14.0 | 10.9 | 12.9 | 11.9 | 13.1 |
| Tear strength nicked (kN/m) | 6.7 | 8.6 | 6.9 | 9.4 | 5.1 | 7.5 | 6.6 | 8.4 |
| LCR viscosity @ 1200 s-1, 204° C. (Pa · s) | 70.0 | 74.4 | 72.7 | 72.6 | 87.8 | 83.3 | 104.7 | 89.4 |
| Compression set @ RT (%) | 17.5 | 18.6 | 17.6 | 19.1 | 12.7 | 16.3 | 13.4 | 16.2 |
| Compression set @ 70° C. (%) | 29.3 | 29.8 | 30.6 | 32.3 | 21.5 | 23.1 | 20.9 | 25.0 |
| Compression set @ 100° C. (%) | 35.2 | 35.3 | 37.2 | 37.6 | 27.4 | 26.49 | 24.3 | 29.8 |
| Surface roughness-Ra value (μinch) | 34.84 | 22.30 | 38.98 | 35.24 | 35.34 | 34.09 | 41.80 | 35.13 |
| Surface roughness-Ra value (μm) | 0.89 | 0.57 | 0.99 | 0.90 | 0.90 | 0.87 | 1.06 | 0.89 |

As shown in Table 6, compositions 14, 16, 18, and 20 exhibited improvements in tensile strength, tear resistance, and surface roughness. These mechanical properties confirmed that the elastomeric component was at least partial cross-linked.

Example 4

Two thermoplastic elastomer compositions were prepared and compared to conventional compositions that did not 1.784 kg of a base oil composed of synthetic poly-α-olefinic oil was added to a room temperature kettle. The kettle mixer paddles were operated while pumping with a back pressure in a recycle loop. For 2-3 minutes, 0.352 kg of a bentonite clay product, which is commercially available as Baragel® clay from Elementis Specialities in Belgium, was added and mixed for about 10 minutes. Then 0.022 kg of glycerin and 0.042 kg of propylene carbonate activator were added. The kettle pumped for about 20 minutes until the grease became too thick to pump. Mixing continued for 30 minutes to achieve homogeneity. For each composition, this process was repeated to prepare a desired amount of particulate.

TABLE 7

Formulation (wt. %)

| | Composition No. | | | | |
|---|---|---|---|---|---|
| | Peroxide Curing Agent | | | | Phenolic Curing agent |
| | 21C | 22 | 23 | 24C | 25 |
| EPDM rubber II | 28.33 | 28.33 | 30.05 | 30.05 | 29.77 |
| Clay | 11.90 | 3.40 | — | 8.71 | — |
| Peroxide Curing Agent | 2.52 | 2.52 | 2.58 | 2.58 | — |
| Peroxide co-agent | 1.13 | 1.13 | 1.16 | 1.16 | — |
| Phenolic Curing Agent | — | — | — | — | 3.75 |
| $SnCl_2$ | — | — | — | — | 0.75 |
| ZnO | — | — | — | — | 0.57 |
| Polypropylene I | — | — | — | — | 6.90 |
| Polypropylene II | 6.80 | 6.80 | 6.96 | 6.96 | 4.31 |
| Polypropylene III | 4.25 | 4.25 | 4.36 | 4.36 | — |
| Anti-oxidant | 0.42 | 0.42 | 0.44 | 0.44 | — |
| Process oil | 44.65 | — | — | 45.74 | — |
| Particulate II | — | 53.15 | 54.45 | — | 53.94 |
| Total | 100 | 100 | 100 | 100 | 100 |

As identified below in Table 8 the physical properties of compositions 21C, 22, 23, 24C, and 25 were measured.

TABLE 8

Physical Properties

| | Composition No. | | | | |
|---|---|---|---|---|---|
| | 21C | 22 | 23 | 24C | 25 |
| Hardness, 15s (ShA) | 46.2 | 50.7 | 49.3 | 46.7 | 40.9 |
| UTS-Peak stress (MPa) | 2.52 | 2.16 | 2.22 | 2.69 | 1.49 |
| Elongation @ break (%) | 286.7 | 287.6 | 312.4 | 293.7 | 465.7 |
| Modulus 10% (MPa) | 0.30 | 0.60 | 0.55 | 0.32 | 0.35 |
| Modulus 20% (MPa) | 0.51 | 0.80 | 0.76 | 0.52 | 0.52 |
| Modulus 50% (MPa) | 0.85 | 1.08 | 1.03 | 0.87 | 0.76 |
| Modulus 100% (MPa) | 1.26 | 1.36 | 1.32 | 1.29 | 0.98 |
| Modulus 300% (MPa) | Nm/b | nm/b | 2.22 | Nm/b | 1.39 |
| Tear strength unnicked (kN/m) | 12.5 | 14.1 | 14.0 | 12.9 | 12.7 |
| Tear strength nicked (kN/m) | 7.3 | 10.1 | 10.1 | 7.1 | 9.3 |
| LCR viscosity @ 1200 s-1, 204° C. (Pa · s) | 65.6 | 59.6 | 60.6 | 67.5 | 65.7 |
| Compression set @ RT (%) | 18.1 | 24.7 | 24.0 | 18.2 | 38.0 |
| Compression set @ 70° C. (%) | 29.0 | 36.7 | 32.8 | 28.1 | 56.3 |
| Compression set @ 100° C. (%) | 34.9 | 47.6 | 51.5 | 32.9 | 85.0 |

Note:
nm/b—not measured, broke before reach 300%

As shown in Table 8, Compositions 22, 23, and 25 exhibited improved tensile strength, tear resistance, and surface roughness. These mechanical properties confirmed that the elastomeric component was at least partial cross-linked using either peroxide curing agents or phenolic curing agents.

What is claimed is:

1. A thermoplastic vulcanizate composition comprising:
   a thermoplastic component,
   an elastomeric component that is in the form of a fully-cured rubber dispersed in said thermoplastic component, wherein the rubber is an ethylene-propylene-diene copolymer and wherein the thermoplastic component includes polypropylene or a propylene-based copolymer, and
   at least one particulate composition dispersed with said thermoplastic component, said elastomeric component, or both said thermoplastic and said elastomeric component; said particulate composition comprising:
   a carrier medium, and
   a particulate material having a thickness in one direction of less than about 50 angstroms and is dispersed in the carrier medium, wherein the particulate material is a clay selected from the group consisting of natural or synthetic phyllosilicate, smectic clay, montmorillonite, nontronite, beidellite, volkonskoite, laponite, hectorite, saponite, sauconite, magadite, kenyaite, stevensite, vermiculite, halloysite, aluminate oxides, hydrotalcite, and combinations thereof, and wherein the at least one particulate composition comprises from about 0.1 to about 65 weight percent clay, based upon the total weight of the particulate composition wherein the particulate composition is selected from the group consisting of lithium simple and complex soap greases, calcium simple and complex soap greases, sodium simple and complex greases, aluminum simple and complex greases, barium simple and complex greases and polyurea greases.

2. The thermoplastic elastomer composition of claim 1, wherein the particulate composition is dispersed within the elastomeric component.

3. The thermoplastic elastomer composition of claim 1, wherein the particulate material is an intercalated and exfoliated clay.

4. The thermoplastic elastomer composition of claim 1, wherein the particulate material has a thickness in one direction of from about 3 to about 20 angstroms.

5. The thermoplastic elastomer composition of claim 1, wherein the clay has a platelet thickness of less than about 50 angstroms.

6. The thermoplastic elastomer composition of claim 1, wherein the particulate material is an intercalated and exfoliated clay.

7. The thermoplastic elastomer composition of claim 1, wherein the at least one particulate composition comprises:
   a first clay grease composition, and
   a second clay grease composition,
   wherein each of the first clay grease composition and the second clay grease composition are dispersed within the thermoplastic component, the elastomeric component, or both the thermoplastic component and the elastomeric component.

8. The thermoplastic elastomer composition of claim 7, wherein the clay of each clay grease compositions has a platelet thickness of less than about 50 angstroms.

9. The thermoplastic elastomer composition of claim 7, wherein the at least one particulate composition comprises from about 0.1 to about 65 weight percent clay, based upon the total weight of the particulate composition.

10. A method of preparing thermoplastic elastomer compositions comprising:
   a. providing a thermoplastic component,
   b. providing an elastomeric component that is in the form of at a fully-cured rubber dispersed in said thermoplastic component, wherein the rubber is an ethylene-propylene-diene copolymer and wherein the thermoplastic component includes polypropylene or a propylene-based copolymer, and c. combining the thermoplastic component and elastomeric component with at least one particulate composition comprising:
a carrier medium, and
a particulate material having a thickness in one direction of less than about 50 angstroms and is dispersed in the carrier medium, wherein the particulate material is a clay selected from the group consisting of natural or synthetic phyllosilicate, smectic clay, montmorillonite, nontronite, beidellite, volkonskoite, laponite, hectorite, saponite, sauconite, magadite, kenyaite, stevensite, vermiculite, halloysite, aluminate oxides, hydrotalcite, and combinations thereof, and wherein the at least one particulate composition comprises from about 0.1 to about 65 weight percent clay, based upon the total weight of the particulate composition, wherein the particulate composition is dispersed within the thermoplastic elastomer component, the elastomeric component, or both the thermoplastic component and the elastomeric component; and
wherein the particulate composition is selected from the group consisting of lithium simple and complex soap greases, calcium simple and complex soap greases, sodium simple and complex greases, aluminum simple and complex greases, barium simple and complex greases and polyurea greases.

11. The method of preparing a thermoplastic elastomer composition of claim 10, further comprising the step of curing the elastomeric component.

12. The method of preparing a thermoplastic elastomer composition of claim 11, wherein the curing step occurs prior to combining the thermoplastic component and elastomeric component with the particulate composition.

13. The method of preparing a thermoplastic elastomer composition of claim 11, wherein the curing step dynamically vulcanizes the thermoplastic elastomer composition.

14. The method of preparing a thermoplastic elastomer composition of claim 10, wherein the particulate material is a mineral, a mineral compound, a clay, carbon particles, nanotubes, or combination thereof.

15. The method of preparing a thermoplastic elastomer composition of claim 10, wherein the at least one particulate composition comprises from about 0.1 to about 65 weight percent clay, based upon the total weight of the particulate composition.

16. The method of preparing a thermoplastic elastomer composition of claim 10, wherein the particulate composition is a clay grease composition.

17. The method of preparing a thermoplastic elastomer composition of claim 10, wherein the at least one particulate composition comprises:
a first clay grease composition, and
a second clay grease composition,
wherein each of the first clay grease composition and the second clay grease composition are independently dispersed within the thermoplastic component, the elastomeric component, or both the thermoplastic component and the elastomeric component.

18. The method of preparing a thermoplastic elastomer composition of claim 17, wherein the first clay grease composition is combined with the thermoplastic component and elastomer component prior to a curing step and the second grease composition is combined with the thermoplastic component and elastomer component after the curing step.

19. An article prepared from the composition of claim 1.

20. The composition of claim 1, wherein the thermoplastic vulcanizate is characterized by a Shore A hardness in excess of 45.2.

* * * * *